United States Patent
Bennett

(10) Patent No.: US 7,444,278 B2
(45) Date of Patent: Oct. 28, 2008

(54) METHOD AND SYSTEM FOR SYNCHRONIZING THE USER INTERFACE LANGUAGE BETWEEN A SOFTWARE APPLICATION AND A WEB SITE

(75) Inventor: James Andrew Bennett, Duvall, WA (US)

(73) Assignee: Microsoft Corporation, Redmond, WA (US)

(*) Notice: Subject to any disclaimer, the term of this patent is extended or adjusted under 35 U.S.C. 154(b) by 795 days.

(21) Appl. No.: 10/806,323

(22) Filed: Mar. 19, 2004

(65) Prior Publication Data

US 2005/0209845 A1  Sep. 22, 2005

(51) Int. Cl.
*G06F 15/177* (2006.01)
*G06F 17/20* (2006.01)
*G10L 11/00* (2006.01)
*G10L 21/00* (2006.01)

(52) U.S. Cl. .................. 704/8; 704/270; 704/277; 709/220

(58) Field of Classification Search .............. 704/8, 704/277
See application file for complete search history.

(56) References Cited

U.S. PATENT DOCUMENTS

| | | | |
|---|---|---|---|
| 5,613,122 A * | 3/1997 | Burnard et al. ............ | 713/1 |
| 6,563,800 B1 * | 5/2003 | Salo et al. ................ | 370/264 |
| 2002/0144105 A1 | 10/2002 | Real ......................... | 713/2 |
| 2002/0156902 A1 | 10/2002 | Crandall .................... | 709/228 |
| 2004/0044628 A1 | 3/2004 | Mathew et al. ............. | 705/51 |

OTHER PUBLICATIONS

Peter Constable and Gary Simons, SIL International, 'Language identifiation and IT: Addressing probkems of linguistic diversity on a global scale', SIL Electronic Working Papers 2000-001, Sep. 2000.*

* cited by examiner

*Primary Examiner*—David R. Hudspeth
*Assistant Examiner*—Justin W Rider
(74) *Attorney, Agent, or Firm*—Merchant & Gould; Ryan T. Grace

(57) ABSTRACT

A method and system is generally directed to synchronizing the language used for applications and the language used for information provided across a network. The client language that is associated with the language used for applications on a computing device is detected along with the services language. The services language corresponds to the language used for the user interface of network materials, such as web sites and help pages. The services language is stored online so that the services language and the client language may be made to correspond to one another despite the user moving from online to offline or from one computing device to another, allowing for a consistent user experience.

17 Claims, 5 Drawing Sheets

METHOD AND SYSTEM FOR SYNCHRONIZING THE USER INTERFACE LANGUAGE BETWEEN A SOFTWARE APPLICATION AND A WEB SITE

BACKGROUND OF THE INVENTION

As computer usage gains ground worldwide, a larger demographic of computer users may be reached. Often, an initial consideration for applications and other presentations of data is the language barrier for different users.

To overcome the language barriers, a greater number of applications are produced to provide a user interface (UI) output to users in multiple languages. As more and more languages are included in these versions of programs, the level of sophistication demanded by users in non-English markets also continues to rise. It is expected that Non-English products behave on a par with English products. Some regions may actually have legal requirements that the products reach the level of sophistication of their English counterparts. What is needed is a way to provide a consistent user interface experience regardless of the presentation language used.

SUMMARY OF THE INVENTION

The present invention provides a method and system for synchronizing a user interface language of an application with a user interface language of a network page. A network page refers to various types of network materials, such as web sites, help pages, and other data provided from a network source. The present invention provides functionality for the user interface (UI) language of applications and network sites to be presented in a consistent language selected by the user. Also, the language presented to the user is kept consistent independent of the local machine used and physical location of the user. When the user selects a new language setting, and then logs into a network that has access to a user profile for that user, the profile is updated with the new language setting.

The user may also connect to a public network. The present invention recognizes the available language settings available on the network. If the language settings available do not match the user's selected language setting, the user may be given a choice to use one of language settings available. Also, the user may be presented with the option to prevent the new setting from changing their profile when reconnected with their standard network.

DETAILED DESCRIPTION

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
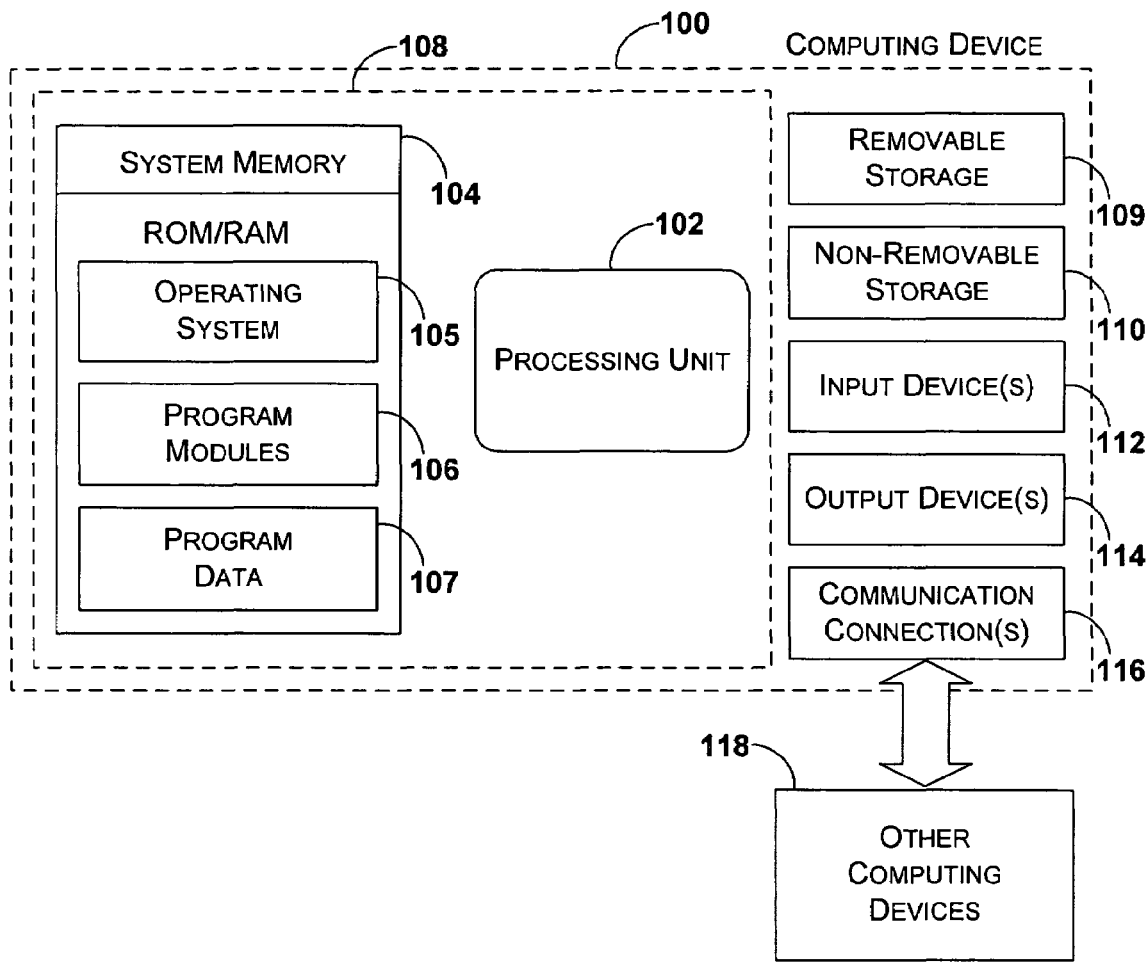
FIG. 1 illustrates an exemplary computing device that may be used in one exemplary embodiment of the present invention.

FIG. 1 shows an exemplary computing device that may be included in system 100 for implementing the invention. Computing device 100 illustrates a general operating environment that may apply to the present invention. In a very basic configuration, computing device 100 typically includes at least one processing unit 102 and system memory 104. Processing unit 102 includes existing physical processors, those in design, multiple processors acting together, virtual processors, and any other device or software program capable of interpreting binary executable instructions. Depending on the exact configuration and type of computing device, the system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100. Computing device 100 may also have input device(s) 112 such as keyboard, mouse, pen, stylus, voice input device, touch input device, etc. Output device(s) 114 such as a display, speakers, printer, etc. may also be included. All these devices are known in the art and need not be discussed at length here.

Computing device 100 may also contain communications connection(s) 116 that allow the device to communicate with other computing devices 118, such as over a network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

User Interface Language Synchronization

The present invention is generally directed to synchronizing the interface language provided to a user for both the applications available and accessed network pages. The language may be changed by the user outside of a specified network and the language setting is automatically updated when the user reconnects to the specified network.

Figure 2:
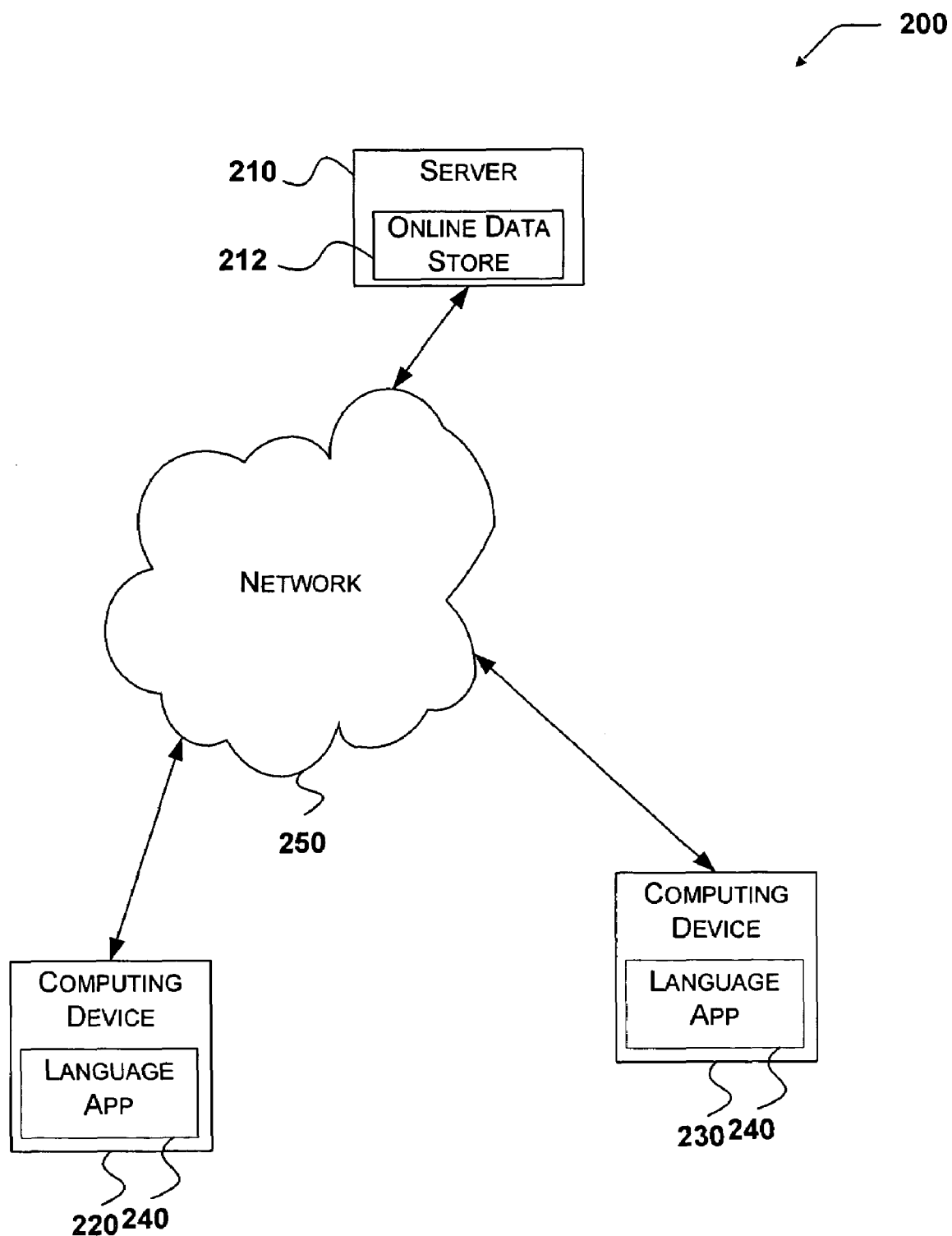
FIG. 2 illustrates an exemplary block diagram for providing a user profile in accordance with the present invention.

FIG. 2 illustrates an exemplary block diagram for providing a user profile in accordance with the present invention. System 200 includes server 210, computing devices 220 and 230, and network 250. Each computing device 220 and 230 includes a language application 240 for implementing the present invention. The language application may actually correspond to a dynamic link library or DLL. In one embodiment, language application 240 is downloaded from network 250 for implementing the functionality of the present invention (e.g., an applet). Server 210 includes network data store 212.

Network data store 212 may be used to store a user profile for a particular user. Within the user profile is stored the language settings for a particular user. By storing the language settings in the user profile, the user may use any computing device (e.g., 220 and 230) and still have the language setting applied to the computing device being used. Network 250 shown may be any network including a local area network, a wide area network, and the Internet.

Figure 3:
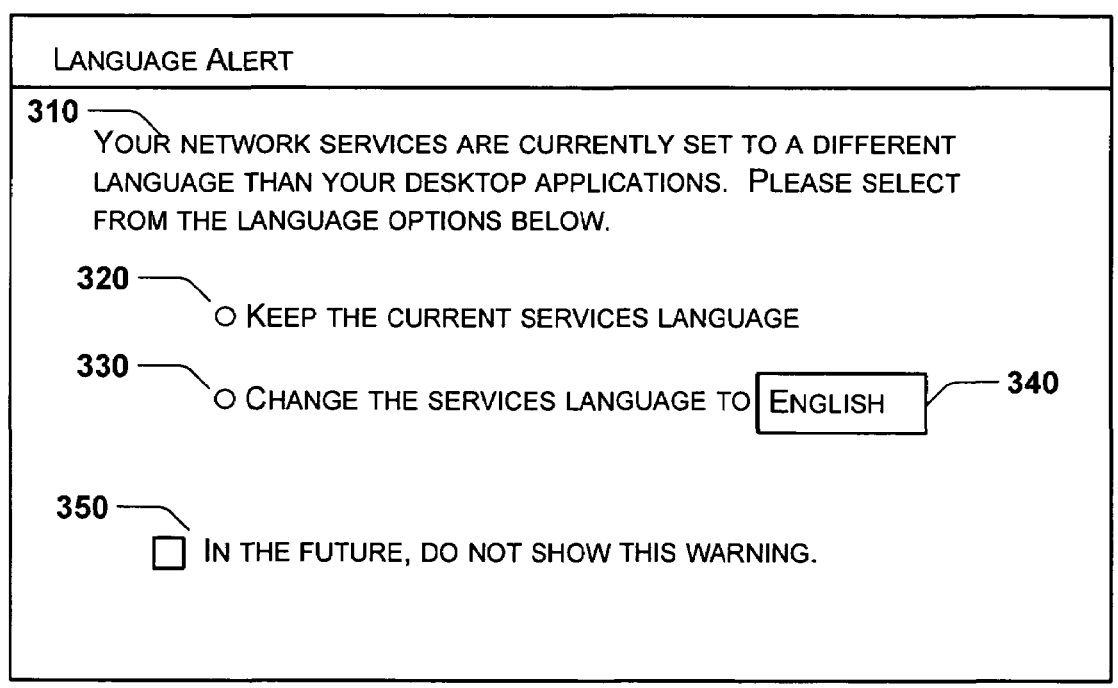
FIG. 3 illustrates an exemplary notification to the user when the client language and the services language do not match in accordance with the present invention.

FIG. 3 illustrates an exemplary notification to the user when the client language and the services language do not match in accordance with the present invention. Notification 300 includes notification text 310 and options 320-350.

Notification text 310 provides the user with the context of the selection for which they are being prompted. In the example shown, the user is notified that the system has discovered that the network services language is different than the client language. The network services language corresponds to the language used to display web pages, help menus, and other network produced materials. The client language corresponds to the language used to display the UI corresponding to desktop applications, such as a word processor.

The user is provided the option of changing the network services language to match a specified language available for displaying the UI for the network services (option 330) or keeping the same network services language (option 320). If the user does select to change the network services language (option 330), option 340 allows the user to select which language of the available languages to display the UI.

Services may not be available in the language matching the current client language. Accordingly, option 340 provides a selection from those service languages that are available.

In another embodiment, the user may select option 350. Selecting option 350 changes the logical value of a local setting that indicates whether to display the notification message in the future. The logical value of the local setting may be a logic "1" or a logic "0". A value of "1" for the setting indicates that future notifications should be displayed to the user when the services language and the client language do not match. In contrast, value of "0" for the setting indicates that future notifications should not be displayed.

In another embodiment, the user may have previously selected option 350. The user is therefore not displayed notification 300 and the network service language is kept different from the client language by default.

In yet another embodiment, the network services language is changed automatically to match the client language. By automatically changing the network services language to match any changes in the client language, notification 300 may not be necessary.

Figure 4:
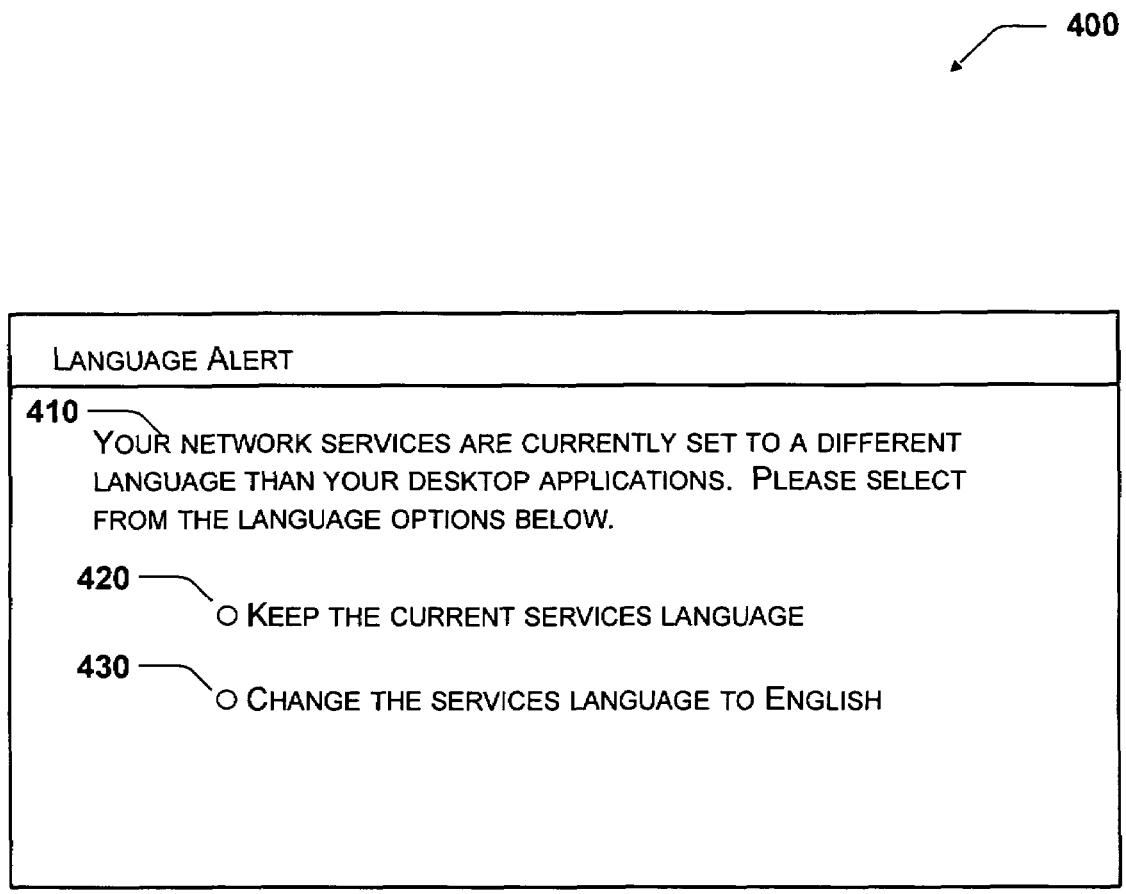
FIG. 4 illustrates another exemplary notification to the user when the client language and the services language do not match in accordance with the present invention.

FIG. 4 illustrates another exemplary notification to the user when the client language and the services language do not match in accordance with the present invention. Notification 400 includes notification text 410 and options 420 and 430.

Notification 400 is similar to notification 300 of FIG. 3, but notification 400 corresponds to when only a single language is available on the computing device selected by the user.

The user is again provided the option of keeping the same services language setting (option 420) or changing the network services language to match the client language (option 430). However, in the example shown, an option corresponding to option 340 of FIG. 3 is not included. Not including a corresponding option for selecting the language indicates that there is no need to choose among languages as only one language is available.

Additionally, an option corresponding to option 350 of FIG. 3 is also not included. Not including an option for selecting whether to show the notification in the future may result from the availability of only a single language. It may be an expectation that a user will desire to change the services language when only a single language is available so that the data provided by the services and the client match. As a result, the user will also desire to change back to their preferred language when their preferred language is again available as a client language. Accordingly, the notification is necessarily shown again to effect the change back to the preferred language.

In another embodiment however, an option corresponding to option 350 of FIG. 3 is included in notification 400. A user may switch regularly between a computing device with a single language and another computing device with multiple languages. By including an option for selecting whether to show the notification in the future, despite the availability of a single language, allows the user to avoid repetitive notifications.

Figure 5:
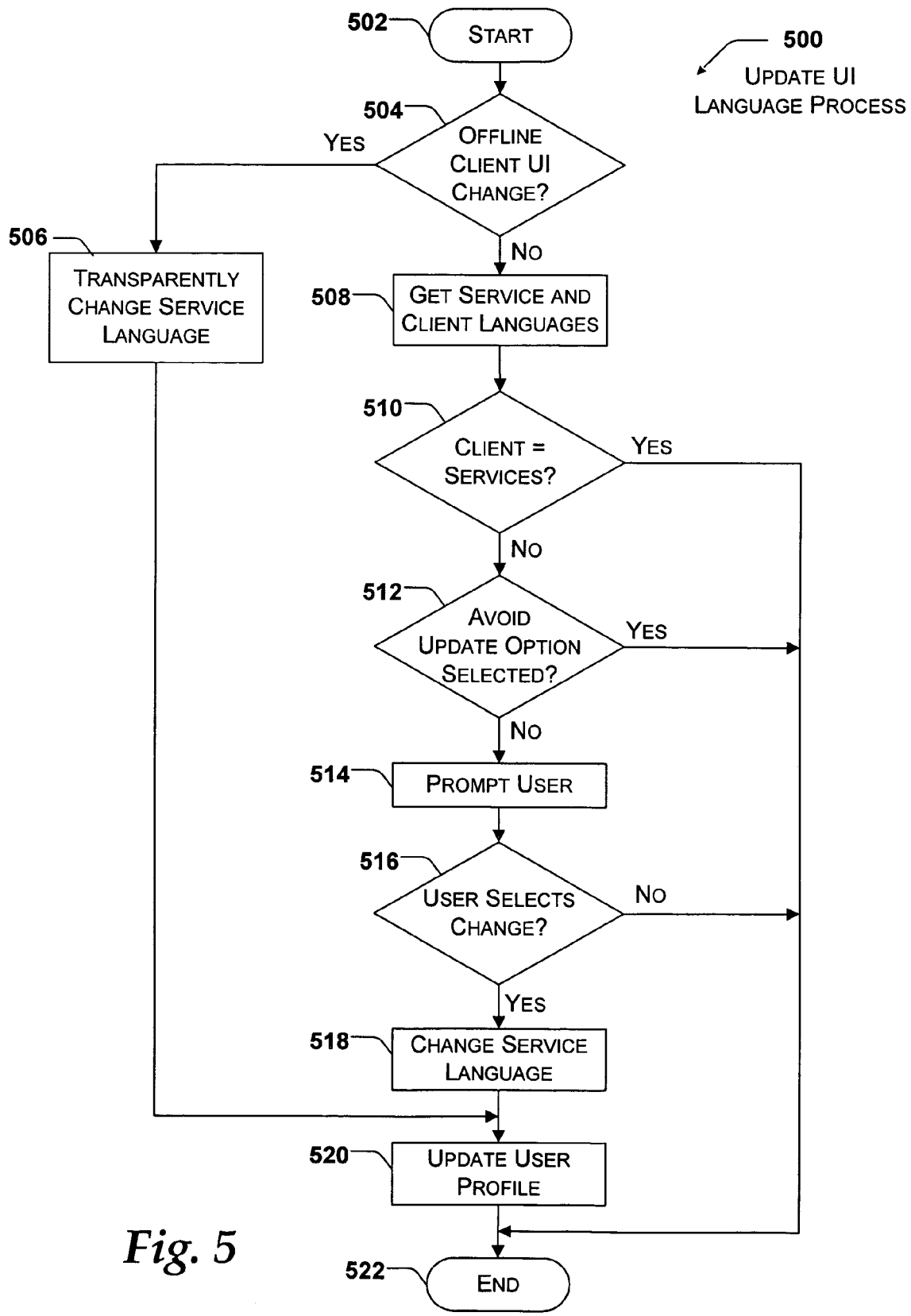
FIG. 5 is a flow diagram for an exemplary process for changing the language setting in accordance with the present invention.

FIG. 5 is a flow diagram for an exemplary process for changing the language setting in accordance with the present invention. In one example, process 500 starts at block 502 where the user has logged into their services account and the user identity is authenticated, connecting the user to a network using a computing device. Processing continues at decision block 504.

At decision block 504, a determination is made whether the language for the UI of a client was changed during an offline mode. The offline mode corresponds to a period of time when the user is using the computing device but is not connected to a network (see Scenarios 3 and 4 below). The language application examines a locally stored setting, such as a registry key, that is triggered from a change of the client language in an offline mode to determine its value. If the local setting has a logical value of "1", the client language was changed during an offline mode, and if the local setting has a logical value of "0", the client language wasn't changed during an offline mode. In a further embodiment, a local setting indicating a change to client language in an offline mode may not even exist. In this embodiment, the local setting is added and given a value of "0" for future examination, and proceeds as if the client language hasn't been changed during an offline mode. If the client language was changed during an offline mode, processing moves to block 506. However, if the client language hasn't been changed during an offline mode, processing advances to block 508.

At block 506, the services language is changed to correspond to the client language change that took place in the offline mode. The change of the services language is transparent to the user, allowing for a seamless user experience. The language application examines a local setting that corresponds to the unique identifier for the current client language. In one embodiment, the unique identifier for the current client language is the LCID (Locale Identifier) of the client language. The language application then changes the unique identifier of the services language to match the unique identifier of the client language. In one embodiment, a locally stored version of the services language is changed rather than the version of the services language stored in the user's profile as described below. Furthermore, the logical value of the local setting that is triggered from a change of the client language in an offline mode is reset to have a logical value of "0". In other embodiments, other logical values may be used to signify that a change of the client language in an offline mode occurred. Processing advances from block 506 to block 520, where the user profile stored in the online data store is updated with the change.

If instead, no change of the client language occurred during an offline mode, the language application gets the service and client language unique identifiers for comparison at block 508. As previously stated, the client language unique identifier is stored within its own local setting. In contrast, the unique identifier for the services language is stored within the user's profile stored in the online data store. In one embodiment, when the language application retrieves the services language, an XML (Extensible Markup Language) file is downloaded to the computing device. The XML file includes the unique identifier for the current services language. The XML file is downloaded from the online data store to the client application on the computing device. The service language is then written into its own corresponding local setting.

In one embodiment, the service language is written to the local setting as a string value that is in RFC-1766 format. In a further embodiment, if this local setting does not exist, the language application creates the local setting and writes in the value. Processing continues at decision block 510.

At decision block 510, the unique identifier for the client language and the unique identifier for the services language are compared. In one embodiment, the unique identifiers are compared using a built-in table associating the unique identifiers. In a further embodiment, the built-in table associates Hex LCIDs and RFC-1766's, and the language application converts the Decimal LCIDs to Hex in order to make this comparison. If the unique identifiers are equivalent, a change of the services language is not required, and processing advances to block 522, where process 500 ends. However, if the client language and the services language are different, processing moves to decision block 512.

At decision block 512, a determination is made regarding whether an option to avoid updating the services language when services language and the client language are different was previously selected. The option is illustrated in FIG. 3 as option 350. Selecting option 350 avoids updating the services language when service language and the client language are different. If option 350 was previously selected, processing advances to block 522, where process 500 ends. However, if option 350 was not previously selected, processing continues at block 514.

At block 514, the user is prompted with a selection of whether to change the services language to correspond to the client language. The notification sent to the user to aid in selecting whether to change the services language may correspond to the exemplary notifications of FIGS. 3 and 4 above. Further notifications or prompting methods may be used without departing from the spirit or scope of the invention. Furthermore, the process of changing the services language to correspond to the client language may be done without any user prompting or notification. Once the user is prompted, processing moves to decision block 516.

At decision block 516, the user selects whether to change the services language to correspond to the client language. The user may make the selection according to the prompted selections as shown in FIGS. 3 and 4. If the user selects not to change the services language, processing advances to block 522, where process 500 ends. In contrast, if the user selects to change the services language, processing continues at block 518. In another embodiment, the language application may authenticate that the correct unique identifier is stored in the corresponding local setting for the services language before ending the process.

At block 518, the services language is changed to correspond to the client language. The language application determines the analogous unique identifier for the services language to correspond to the client language. In one embodiment, the language application determines the analogous RFC-1766 value for the LCID of the client language. The new unique identifier for the services language is then written to its associated local setting. Processing continues at block 520.

At block 520, the user profile stored in the online data store is updated with the new services language. The services are refreshed according to the new language, and processing advances to block 522, where process 500 ends.

In a further embodiment, a default language for the services language may be used. For example, the services language may not match the client language, but the services language corresponds to International English. If International English is considered the default language, further processing is not needed even though the services language and the client language do not match. International English is considered as a reasonable substitute, and therefore the services language need not be changed.

The following scenarios are considered within the scope of the present invention and are provided by way of example:

Scenario 1:

While visiting his office, user A logs into his German services, and then switches his UI to English. The UI language of both his desktop applications and his services switch, although the language of his client and the country/region of his services do not.

Scenario 2:

While in the US, the user and a colleague are looking for a way to work with selected tables of a client application. As their common language is German, the user switches the language of his help to German. The user and his co-worker now find the information they need and produce the selected tables in question.

Scenario 3:

The user departs for Berlin. He switches his UI language preference to German while on the plane to Germany. The UI language of his desktop applications switches immediately, while the UI language of his network services remain in English since he was not connected at the time he switched the setting.

Scenario 4:

The user arrives back at his Berlin office. At this point, his network services (still English) and his client language (German, from the plane ride) are different. He logs into services and his service UI language switches to match his client automatically transparent to the user. His services and client are now the same once again.

Scenario 5:

On a weekend trip to Paris, the user visits a cyber café and logs into his service account from a computing device that has only French client language support installed. The user is prompted that his service (German) and client (French) language don't match. The user chooses to leave his service language as German and continues working. Upon returning to Berlin on Monday, he logs into his services and sees German has remained the language on the web and on his client applications.

Scenario 6:

The user suggests that a co-worker (who speaks Czech) come and see his computing device. The user installs the Czech language support and switches to Czech for displaying the UI so that his co-worker can utilize it. When the user logs in to his service account from the Czech UI, he sees International English services, because Czech services aren't available and the default for unavailable languages is International English.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for synchronizing a language of an application with a language of a network page, comprising:

obtaining a local identifier associated with an application on a client computing device, wherein the local identifier indicates a language of the application, wherein the local identifier is converted to a Hex locale identifier;

obtaining a network service identifier associated with a network service, wherein the network service identifier indicates a language of the network service, wherein the network service identifier includes a string value;

comparing the Hex locale identifier to the string value;

in response to comparing the Hex locale identifier to the string value, generating a prompt for selecting whether to change the language of the network page to correspond to the language of the application when the Hex locale identifier and the string value do not correspond; and changing the language of the network page to correspond to the language of the application when a change of the language of the network page is selected.

2. The computer-implemented method of claim 1, further comprising determining whether a change occurred to the language of the application during an offline mode.

3. The computer-implemented method of claim 2, wherein the language of the network page is transparently changed to correspond to the language of the application when a change occurred to the language of the application during the offline mode.

4. The computer-implemented method of claim 1, wherein comparing the Hex locale identifier to the string value further comprises retrieving the local identifier and the network service identifier from data storage locations.

5. The computer-implemented method of claim 4, wherein the data storage location for the local identifier is a local setting.

6. The computer-implemented method of claim 4, wherein the data storage location for the network service identifier is a user profile included in an online data store.

7. The computer-implemented method of claim 1, further comprising receiving a selection of an option to avoid changing the language of the network page and maintain the language of the network page in response to receiving the selection of the option.

8. The computer-implemented method of claim 1, wherein the local identifier corresponds to an LCID and the network service identifier corresponds to a RFC-1766 value.

9. A computer-readable storage medium that includes computer-executable instructions for synchronizing a language of an application with a language of a network page, comprising:

obtaining a locale identifier associated with an application on a client computing device, wherein the locale identifier indicates a language of the application, wherein the locale identifier is converted to a Hex locale identifier;

obtaining a network service identifier associated with a network service, wherein the network service identifier indicates a language of the network service, wherein the network service identifier includes a string value;

storing the Hex locale identifier and the string value in a table;

determining whether a change occurred to the language of the application during an offline mode by detecting a changed value in a registry key;

automatically changing the language of the network page to correspond to the language of the application when the registry key indicates a changed value;

comparing the Hex locale identifier stored in the table to the string value stored in the table when no change occurred to the language of the application during the offline mode;

in response to comparing the Hex locale identifier to the string value, generating a prompt for selecting whether to change the language of the network page to correspond to the language of the application when the Hex locale identifier and the string value do not correspond;

maintaining the language of the network page when an option to avoid changing the language of the network page is selected; and changing the language of the network page to correspond to the language of the application when selected, when the language of the network page and the language of the application are not equivalent, and when the option to avoid changing the language of the network page is not selected.

10. The computer-readable storage medium of claim 9, wherein obtaining the locale identifier and obtaining the network service identifier further comprises retrieving the locale identifier and the network service identifier from data storage locations.

11. The computer-readable storage medium of claim 10, wherein the data storage location for the locale identifier is a local setting.

12. The computer-readable storage medium of claim 10, wherein the data storage location for the network service identifier is a user profile included in an online data store.

13. A system for synchronizing a language of a client application with a language of a network page, comprising:
   a processor; and
   a memory having a language application stored thereon, wherein the language application is configured to:
      obtain a local identifier associated with a client application on a client computing device, wherein the local identifier indicates a language of the client application, wherein the local identifier is converted to a Hex locale identifier;
      obtain, from a server, a network service identifier associated with a network service, wherein the network service identifier indicates a language of the network service, wherein the network service identifier includes a string value;
      compare the Hex locale identifier to the string value;
      in response to comparing the Hex locale identifier to the string value, generate a prompt for selecting whether to change the language of the network page to correspond to the language of the application when the Hex locale identifier and the string value do not correspond; and
      change the language of the network page to correspond to the language of the application when a change of the language of the network page is selected.

14. The system of claim 13, wherein the language application is further configured to determine whether a change occurred to the language of the client application during an offline mode.

15. The system of claim 13, wherein the language application is further configured to transparently change the language of the network page to correspond to the language of the client application when a change occurred to the language of the client application during the offline mode.

16. The system of claim 13, wherein the language application is further configured to retrieve the local identifier from a local setting and the network service identifier from the online data store.

17. The system of claim 13, wherein the language application is further configured to avoid changing the language of the network page when an option to avoid changing the language of the network page is selected.

\* \* \* \* \*